(No Model.)  2 Sheets—Sheet 1.

A. A. CURRY.
STOP AND CHAMFER PLANE.

No. 515,659. Patented Feb. 27, 1894.

WITNESSES
H. A. Lamb
P. M. Reynolds

INVENTOR
Alfred A. Curry
By A. M. Wooster
Attorney (No Model.)  A. A. CURRY.  2 Sheets—Sheet 2.
STOP AND CHAMFER PLANE.

No. 515,659.  Patented Feb. 27, 1894.

WITNESSES
H. A. Lamb
P. M. Reynolds

INVENTOR
Alfred A. Curry
By H. M. Wooster
Attorney

UNITED STATES PATENT OFFICE.

ALFRED A. CURRY, OF BRIDGEPORT, CONNECTICUT.

STOP AND CHAMFER PLANE.

SPECIFICATION forming part of Letters Patent No. 515,659, dated February 27, 1894.

Application filed February 4, 1893. Serial No. 461,006. (No model.)

*To all whom it may concern:*

Be it known that I, ALFRED A. CURRY, a subject of the Queen of Great Britain, residing at Bridgeport, in the county of Fairfield and State of Connecticut, have invented certain new and useful Improvements in Stop and Chamfer Planes; and I do hereby declare the following to be a full, clear, and exact description of the invention, such as will enable others skilled in the art to which it appertains to make and use the same.

My invention has for its object to produce a chamfering and molding plane that will cut a stop without change of position of the cutter by the same movement that the chamfer or molding is cut, thereby doing away with the necessity of using a chisel or other tool to cut stops at the end of the molding or chamfer, or with the use of a tool held in a vertical position to scrape the surface of the molding or chamfer after it has been roughened out by a routing tool. It will be seen therefore that my novel tool performs the functions both of a router and a finishing tool, in addition to cutting both stops.

Figure 1:
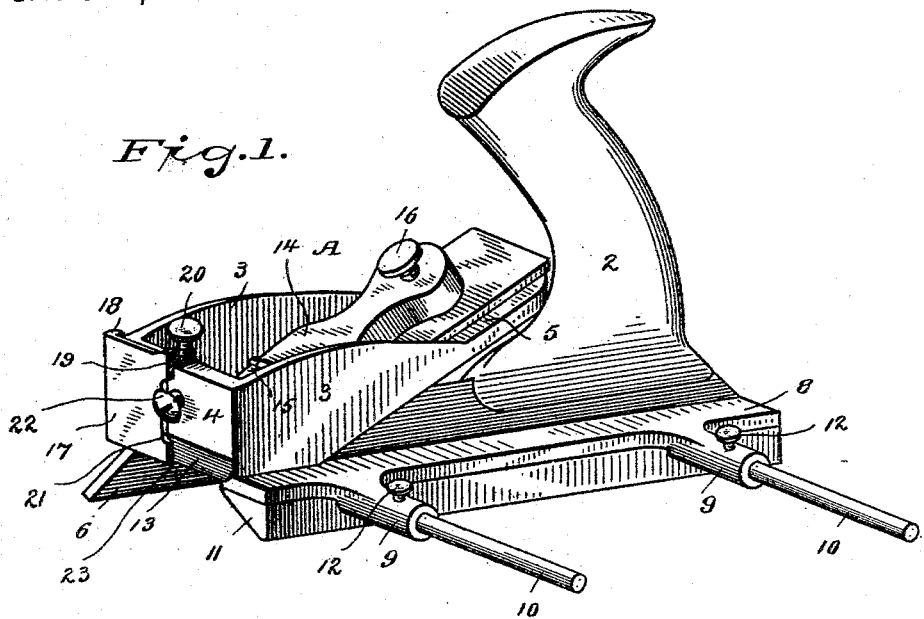
Figure 2:
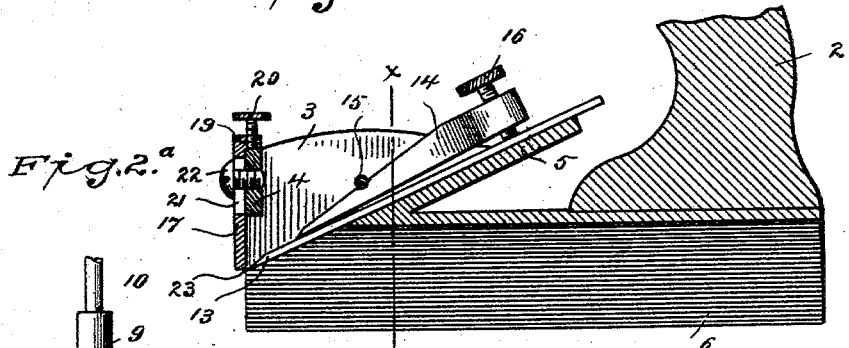
Figure 3:
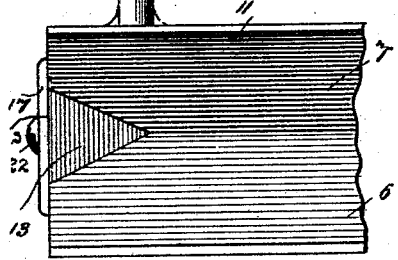
Figure 3:
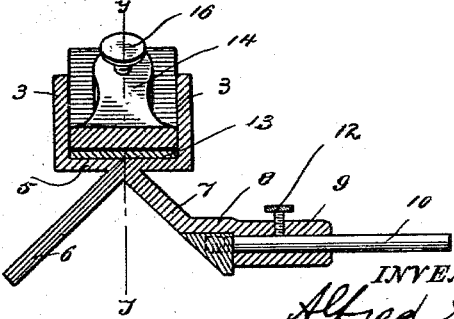
Figure 4:
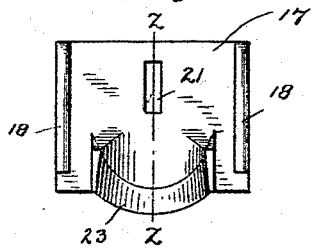
Figure 5:
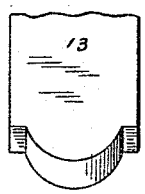
Figure 6:
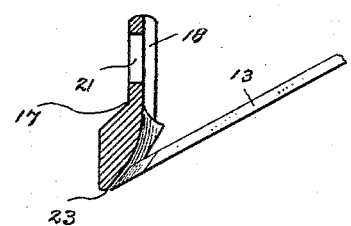
Figure 7:
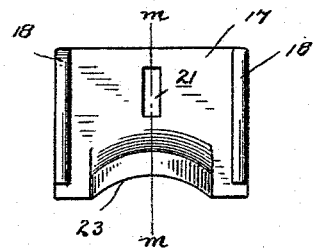
Figure 8:
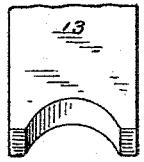
Figure 9:
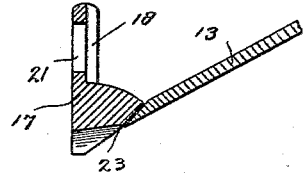
Figure 10:
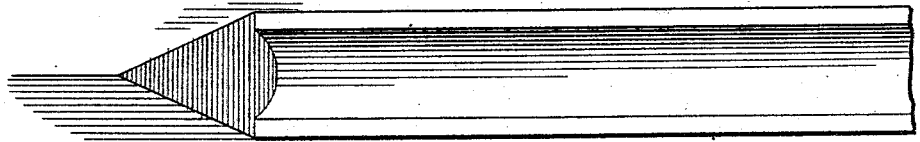
Figure 11:
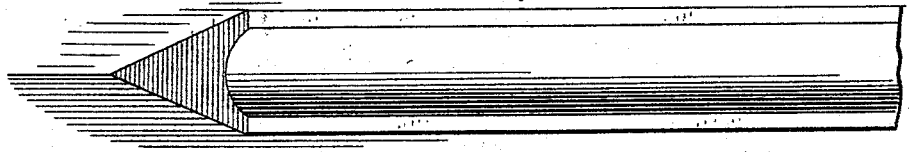
Figure 12:
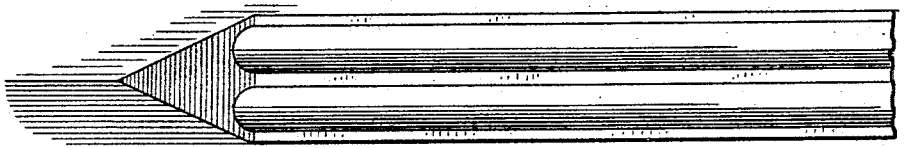

In the accompanying drawings forming part of this specification Figure 1 is a perspective of my novel plane adjusted for use as a chamfer plane, the mouth piece being in section; Fig. 2 a section on the line $y\,y$ in Fig. 3; Fig. 2ª an inverted plan view of the forward end of my novel plane corresponding with Fig. 2; Fig. 3 a section on the line $x\,x$ in Fig. 2. Figs. 4 and 7 are elevations of different forms of mouth pieces; Figs. 5 and 8 elevations illustrating cutters corresponding therewith; Fig. 6 a section on the line $z\,z$ in Fig. 4 the cutter also being shown in edge view; Fig. 9 a section on the line $m\,m$ in Fig. 7 the corresponding cutter also appearing in section; Fig. 10 a view of a molding and stop made by the cutter illustrated in Fig. 5; Fig. 11 a view of a molding and stop made by the cutter illustrated in Fig. 8, and Fig. 12 is a view of still another form of molding and stop, the latter being made by the same cutter which cuts the molding, as in the other forms.

A denotes the body of the plane as a whole, and 2 denotes the handle. These parts may be of any ordinary or preferred construction adapted to this class of work. In the plane illustrated in the drawings 3 denotes the side plates, 4 the front plate, and 5 the incline of the cutter box or blade holder, and 6 and 7 are the angle plates which engage the sides of the piece of wood to be chamfered. Angle plate 7 is not as long as angle plate 6 and terminates in a horizontal plate 8, said plate being formed integral with depending holders 9, which receive rods 10, said rods carrying at their inner ends a side gage 11 the inner face of which corresponds with the inner incline of plate 7 and the top corresponding with the under side of the horizontal plate. The adjustment of the side gage determines the depth of the cut made by the cutter in forming the chamfer or molding.

12 denotes set screws which engage rods 10 to lock the side gage in position after adjustment.

13 denotes the cutter or blade, the cutting edge of which is of course shaped to correspond with the shape of the chamfer or molding it is desired to produce, a straight edge of course producing a straight chamfer and an inwardly or outwardly curved edge producing a corresponding curve in the piece of wood that is operated upon. The cutter is held in position by the usual lever 14 which has its fulcrum on a transverse pin 15 and is provided at its upper end with a set screw 16 which is adapted to bear against the upper end of the cutter and when turned downward upon the cutter raises the upper end of the lever thereby forcing the lower end of the lever down upon the lower end of the cutter and clamping it in place.

It will be seen from Figs. 2 and 2ª that the cutter or blade is not used in the ordinary way, that is with the beveled side down. In my improved plane the cutter is used with the face side down the bevel being upon the upper side so that in use I cut away the wood that is to be removed instead of scraping it away. In use the cutter or blade rests upon the incline there being no open space whatever back of or under the cutter.

17 denotes the mouth piece which I have shown as provided with side lips 18 to engage the side plates 3 of the cutter box with a lug 19 on the top through which a set screw 20 passes, said set screw engaging the top of the front plate to adjust the mouth piece, and with a slot 21 through which a set screw 22 passes which engages the front plate to lock the mouth piece in position after adjustment. The essential feature of the mouth piece is that it is provided with an operative face 23 which in all cases corresponds exactly with the curvature of the cutting edge. If the cutting edge is a convex curve, as in Fig. 5 producing a concave curve in the molding as in Fig. 10, the operative face of the mouth piece is extended outward from the vertical plane of the body thereof as clearly shown in Fig. 6. If the cutting edge is a concave curve as in Fig. 8 producing a convex curve in the molding as in Fig. 11, the operative face of the mouth piece extends inward from the vertical plane of the body thereof as clearly shown in Fig. 9.

By making the cutter box part of the body, i. e., stationary, and dispensing entirely with a front gage using a side gage in lieu thereof, I insure that the plane in use shall wear evenly from front to back. Where a front gage is used the wear is at the back of the plane which greatly shortens its life. The cutter when once adjusted does not require to be shifted in changing from one kind of work to another, the thickness of the shaving in all kinds of work being regulated by the adjustment of the mouth piece.

In use the operator selects the proper cutter to produce the molding or chamfer required, and having placed it in position with the face side down and the bevel up and locked it there, he adjusts the mouth piece to cut as thick a shaving as the quality or hardness of the wood will warrant. In case the molding is very small or the chamfer shallow it will be necessary to set the side gage inward. To cut a stop and a chamfer or molding the operator simply places the cutting edge at the point in the piece of wood to be operated upon where the stop is to commence and presses firmly downward and forward taking care to stop the tool before the end of the chamfer or molding is reached. He then repeats the operation from the other end, these two operations serving as a matter of fact to complete perfectly both stops and the chamfer or molding.

The side gage is to be used with a knife having either a straight cutting edge or an edge of any desired configuration. It is not necessary that the chamber should be perfectly symmetrical on each side of its center as it may be of a variety of forms and these may be secured by using a knife having a curved cutting edge and by adjusting the side gage more or less inwardly.

Having thus described my invention, I claim—

1. A chamfer plane comprising the body formed of the angle plates 6, 7, the inclined plate 5 with the side plates 3, 3, rigidly connected thereto the cross or front plate 4 connecting the side plates and constituting with them the box, the cutter arranged in said box and projecting under the front plate 4 and the vertically adjustable mouth piece carried by the said front plate 4, substantially as described.

2. In combination, the body comprising the angle plates 6, 7 with the incline 5 and the side plates 3, the cross or front plates 4 between the front ends of the side plates and constituting therewith the box of the plane, the knife arranged in the box, and the mouth plate secured adjustably to the front side of the box and having lips extending around the front corners of the box, substantially as described.

3. In combination in a chamfer plane, the angle plates 6 and 7 rigidly connected together forming a solid body portion, the knife adjustably carried by the said solid body part, one of said angle plates having a recess in its inner face, the adjustable side gage adapted to said recess to present a flush surface with the face of the recessed angle plate and movable transversely across the angular space, and the means for adjusting and holding said side gage, substantially as described.

4. In combination the angle plates 6 and 7, the knife having its front cutting edge extending to the front end of the angle plates, and the mouth plate also arranged at the front end of the angle plates above the cutting edge, said mouth plate consisting of a flat piece arranged vertically being adjustable vertically of the front end of the plane said angle plates constituting the gage frame and being free from projecting portions forward of the cutting edge, substantially as described.

5. A chamfer plane comprising the body formed of the angle plates, the side plates and the inclined plate rigidly connected thereto, the cross or front plate 4 constituting with them the box, the cutter arranged within said box projecting under the front plate and having a cutting edge adapted to form a rib or depression and the mouth piece carried by the front plate 4 and having a projection at its lower end extending substantially at right angles to the body of the mouth piece and conforming to the cutting edge, substantially as described.

In testimony whereof I affix my signature in presence of two witnesses.

ALFRED A. CURRY.

Witnesses:
A. M. WOOSTER,
P. M. REYNOLDS.